March 6, 1951 S. S. MADER 2,544,604
TOOL GRINDING MACHINE
Filed May 3, 1947 9 Sheets-Sheet 1

Fig.1

Inventor
Stewart S. Mader

By Harold W. Eaton
Attorney

Fig. 2

Inventor
Stewart S. Mader
By
Harold W. Eaton  Attorney

March 6, 1951 S. S. MADER 2,544,604
TOOL GRINDING MACHINE
Filed May 3, 1947 9 Sheets-Sheet 3

Fig. 3

Inventor
Stewart S. Mader

By Harold W. Eaton Attorney

March 6, 1951  S. S. MADER  2,544,604
TOOL GRINDING MACHINE

Filed May 3, 1947  9 Sheets-Sheet 4

Inventor
Stewart S. Mader

By Harold W. Eaton
Attorney

March 6, 1951     S. S. MADER     2,544,604
TOOL GRINDING MACHINE Filed May 3, 1947     9 Sheets-Sheet 6

Inventor
Stewart S. Mader

By Harold W. Eaton
Attorney

March 6, 1951  S. S. MADER  2,544,604
TOOL GRINDING MACHINE
Filed May 3, 1947  9 Sheets-Sheet 7

INVENTOR.
Stewart S. Mader
By Harold W. Eaton
Attorney

Fig. 13

March 6, 1951  S. S. MADER  2,544,604
TOOL GRINDING MACHINE
Filed May 3, 1947  9 Sheets-Sheet 9

INVENTOR.
Stewart S. Mader
BY
Harold W. Eaton
Attorney

Patented Mar. 6, 1951

2,544,604

UNITED STATES PATENT OFFICE 2,544,604

TOOL GRINDING MACHINE

Stewart S. Mader, Worcester, Mass., assignor to Norton Company, Worcester, Mass., a corporation of Massachusetts Application May 3, 1947, Serial No. 745,799

4 Claims. (Cl. 51—55)

This invention relates to grinding machines and more particularly to a tool grinding machine.

One object of the invention is to provide a simple and thoroughly practical grinding machine for grinding edge or cutting tools with predetermined clearance and rake angles. Another object of the invention is to provide an improved tool grinding machine in which the grinding wheel rotates and oscillates while the tool is supported in a tool holder with a master form or template arranged to control the movement of the holder so that the tool being ground is ground with predetermined clearance angles and to a predetermined shape.

Another object of the invention is to provide an improved tool grinding machine in which a master tool may be readily ground to predetermined specifications as to shape and clearance angles. Another object of the invention is to provide an improved tool grinder in which a master tool may be first formed to a predetermined shape and contour after which a template may be ground and the template thereafter used to grind new cutting tools and to regrind worn cutting tools to the predetermined specifications. Another object of the invention is to provide an improved tool grinder with a clearance setting gage to facilitate setting the tool holder so that predetermined clearance angles may be ground on a master tool. Another object of the invention is to provide an improved tool holder with a protractor head to facilitate grinding predetermined edge angles on the master tool to be ground. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

One embodiment of the invention has been illustrated in the accompanying drawings, in which like reference numerals indicate like parts and wherein.

An improved tool grinding machine has been illustrated in the drawings comprising a base 15 which supports a pivotally mounted work table 16. The work table 16 is supported by a pair of aligned pivot studs 17 and 18. The studs 17 and 18 are in turn supported by a pair of upwardly extending brackets 19 and 20 which are fixedly mounted relative to the base 15.

To facilitate adjustment of the table 16, a vertically arranged adjusting screw 21 is slidably supported in a cylindrical aperture 22 and a cylindrical aperture 23 formed in a pair of spaced brackets 24 and 25 which are fixedly mounted relative to the base 15. A key 26 (Fig. 13) which is fixedly mounted within the bracket 25 engages a key slot formed in the periphery of the screw 21. A ball 27 is supported adjacent to the front edge of the work table 16 on its underside in alignment with the upper surface of the screw 21.

Figure 13:
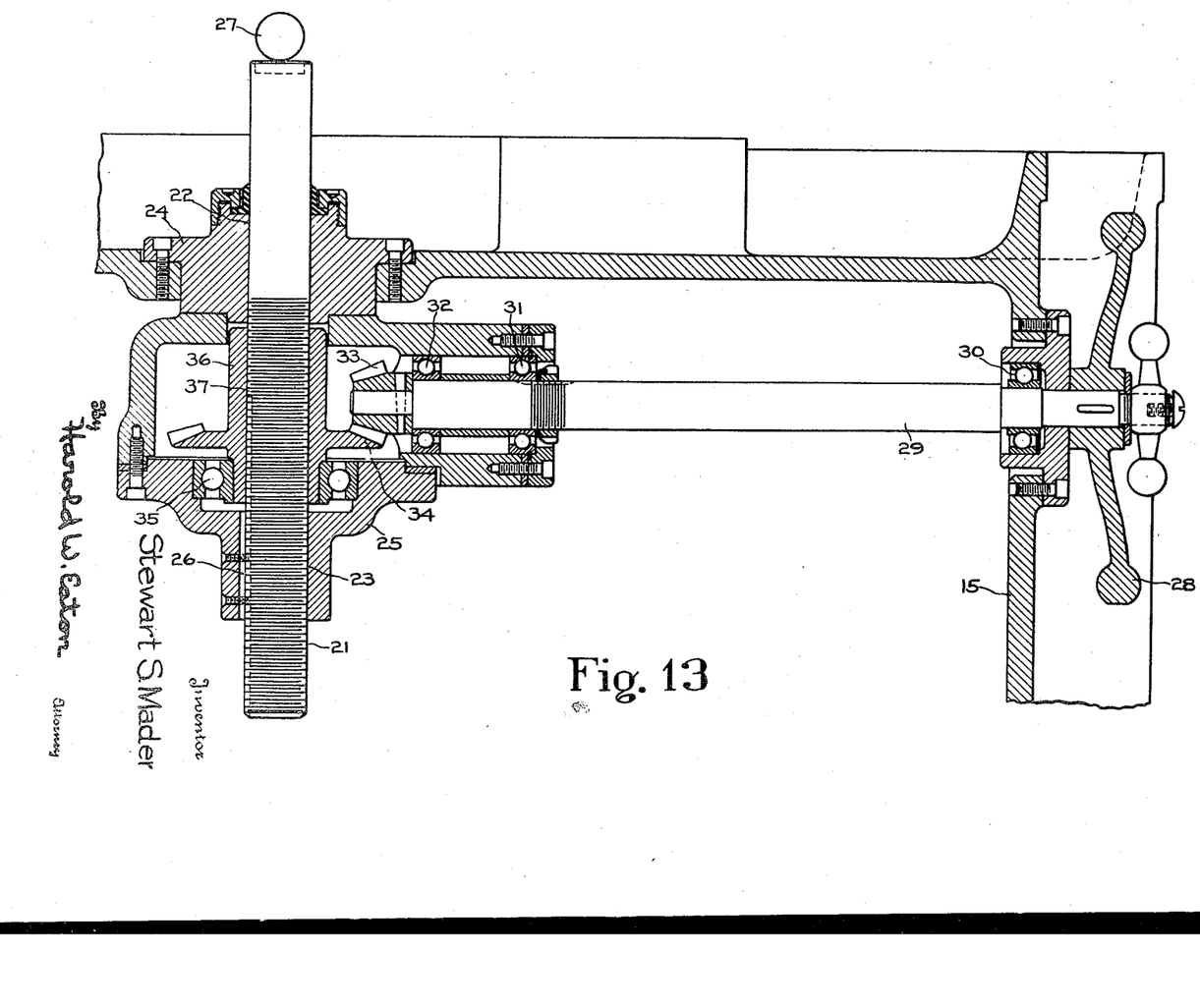
Fig. 13 is a vertical sectional view, on an enlarged scale, through the table adjusting mechanism.

To facilitate adjustment of the screw 21, a manually operable hand wheel 28 is mounted on the right hand end of a rotatable shaft 29 (Fig. 13). The shaft 29 is rotatably journalled in anti-friction bearings 30, 31 and 32. The left hand end of the shaft 29 supports a bevel gear 33 which meshes with a bevel gear 34. The bevel gear 34 is rotatably supported by an anti-friction bearing 35. The bevel gear 34 has an upwardly extending integral hub 36. The inner aperture of the bevel gear 34 and the hub 36 is threaded to mesh with the thread on the screw 21. It will be readily apparent from the foregoing disclosure that rotation of the hand wheel 28 will be transmitted through the mechanism above described to raise or lower the screw 21 and thereby to adjust the position of the work table 16 so that it may be positioned in a horizontal plane or if desired adjusted to a predetermined angular position.

Figure 1:
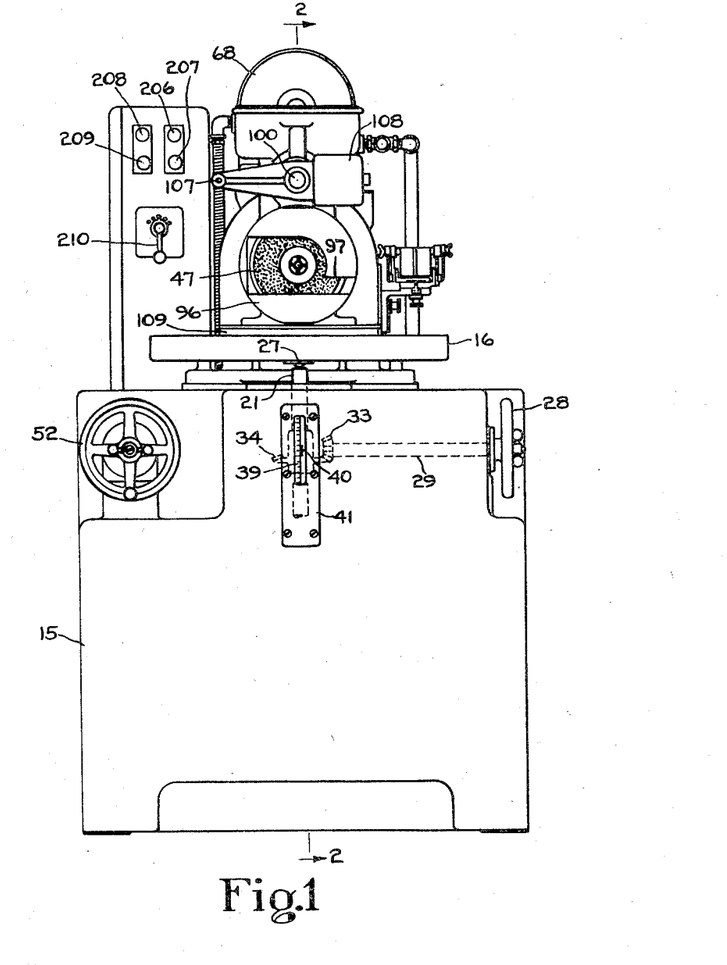
Fig. 1 is a front elevation of the improved tool grinding machine.
Figure 2:
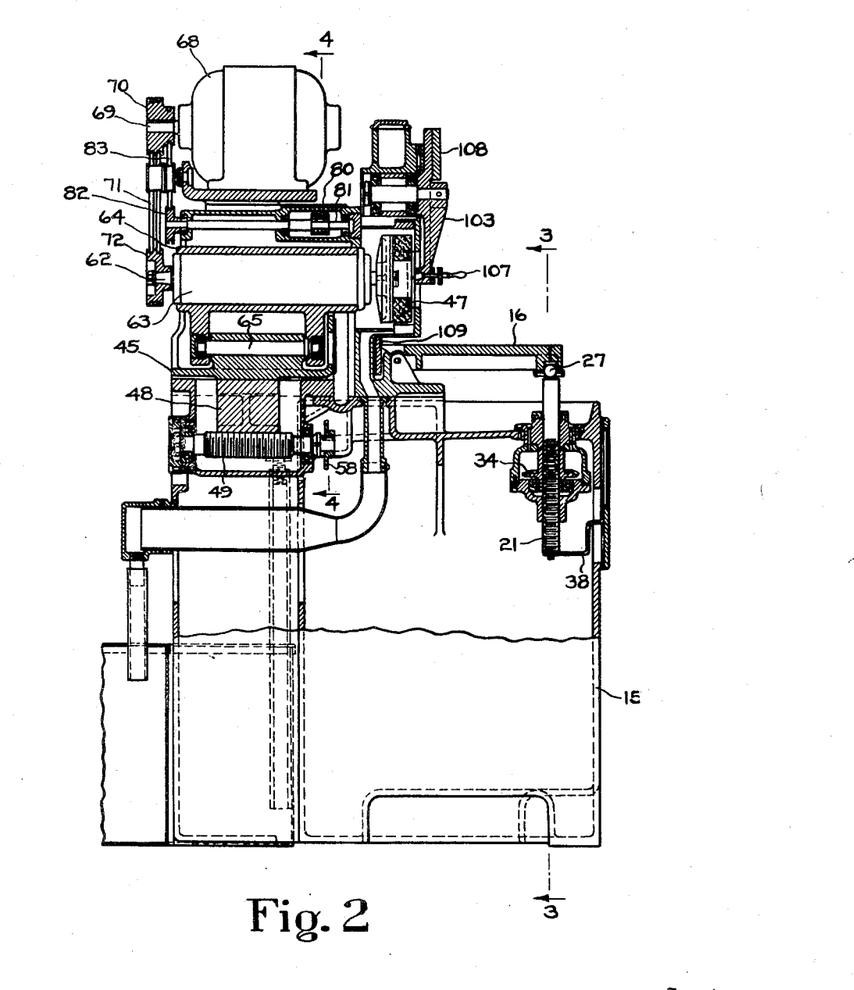
Fig. 2 is a vertical sectional view taken approximately on the line 2—2 of Fig. 1, showing the lower portion of the base in elevation.

To facilitate precise adjustment of the table 16, a bracket 38 is fastened to the lower end of the screw 21 (Fig. 2). The bracket 38 is provided with a vertical extension which is formed as a graduated scale 39 (Fig. 1). A vernier 40 is formed on a plate 41 which is fastened to the front of the machine base 15. The vernier scale 40 is arranged beside the graduated scale 39. By use of the graduated scale 39 and the vernier scale 40, the table 16 may be precisely adjusted either into a horizontal plane or at an angle thereto as desired.

A transversely movable wheel slide 45 (Fig. 4) is arranged to slide transversely relative to the base 15 on a dovetailed slideway 46. The wheel slide 45 serves as a support for a rotatable grinding wheel 47.

The wheel slide is arranged so that it may be fed transversely relative to the base 15 by means of a suitable feeding mechanism which may comprise a half nut 48 depending from the underside of the slide 45. The half nut 48 meshes with a rotatable cross feed screw 49. The cross feed screw 49 is journalled in anti-friction bearings 50 and 51 mounted in the base 15 of the machine.

Figure 6:
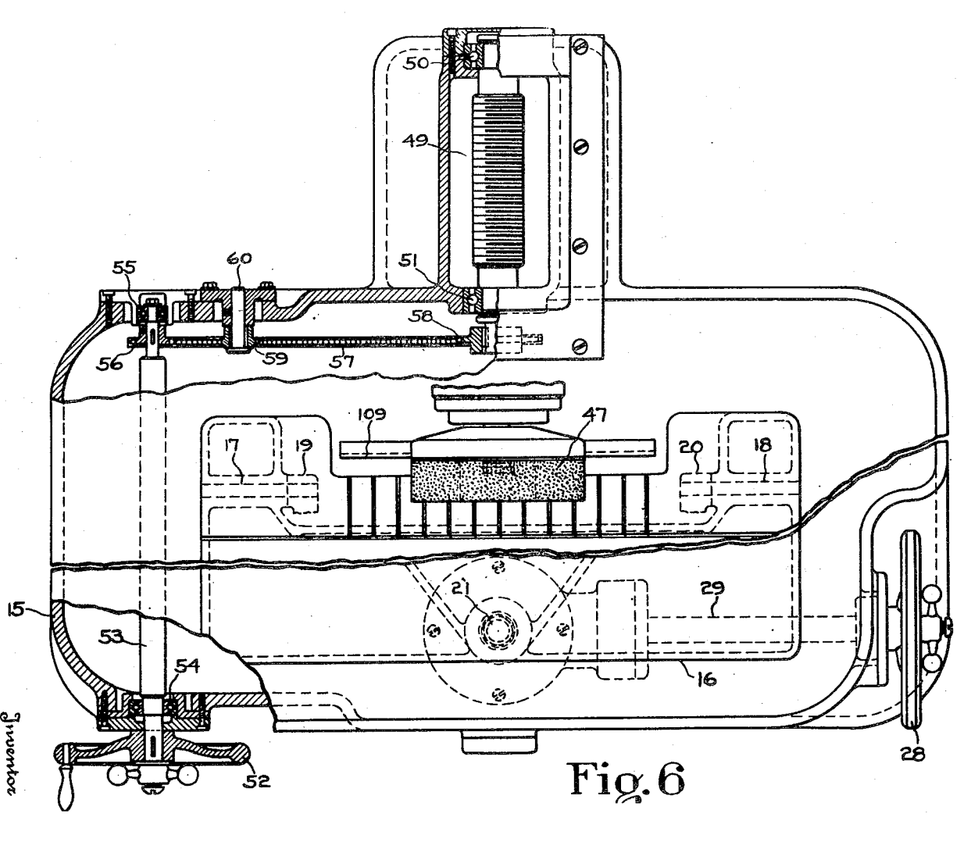
Fig. 6 is a fragmentary plan view of the tool grinding machine, on an enlarged scale, with the wheel head removed and parts of the base broken away and shown in section to more clearly illustrate the wheel feeding and adjusting mechanism.

To facilitate adjustment of the wheel slide 45, a manually operable feed wheel 52 is mounted on the forward end of a rotatable shaft 53 (Fig. 6). The shaft 53 is supported in anti-friction bearings 54 and 55 which are in turn fixedly mounted relative to the base 15. The shaft 53 is provided with a sprocket 56 which is connected by a link chain 57 with a sprocket 58 which is keyed to the forward end of the feed screw 49 (Fig. 6). An idler sprocket 59 is rotatably supported on a stud 60 to facilitate taking up slack in the link chain 57.

The grinding wheel 47 is supported on the right hand end of a wheel spindle 62 (Fig. 2). The wheel spindle is rotatably supported in bearings (not shown) mounted in the cylindrical cartridge 63. This cartridge 63 is one of the standard wheel mountings now available on the market which contains suitable bearings and a wheel spindle supported thereby. It is therefore not deemed necessary to illustrate and describe in detail the bearing structure contained within the cartridge 63. The cartridge 63 together with the spindle 62 and grinding wheel 47 are supported in a pivotally mounted frame 64. The frame 64 is pivotally supported on a rock shaft 65 which is in turn supported on the wheel slide 45.

A driving motor 68 is mounted on top of the wheel head (Fig. 2). The motor armature shaft 69 is provided with a multi-V-groove pulley 70 which is connected by a pair of V-belts with a multi-V-groove pulley 72 mounted on the left hand end of the wheel spindle 62. An idler pulley 73 (Figs. 2 and 4) serves to take up the slack in the driving belts 71. It will be readily apparent from the foregoing disclosure that when the motor 68 is started, a rotary motion will be imparted through the driving mechanism above described to rotate the wheel spindle 62 and the grinding wheel 47.

Figure 4:
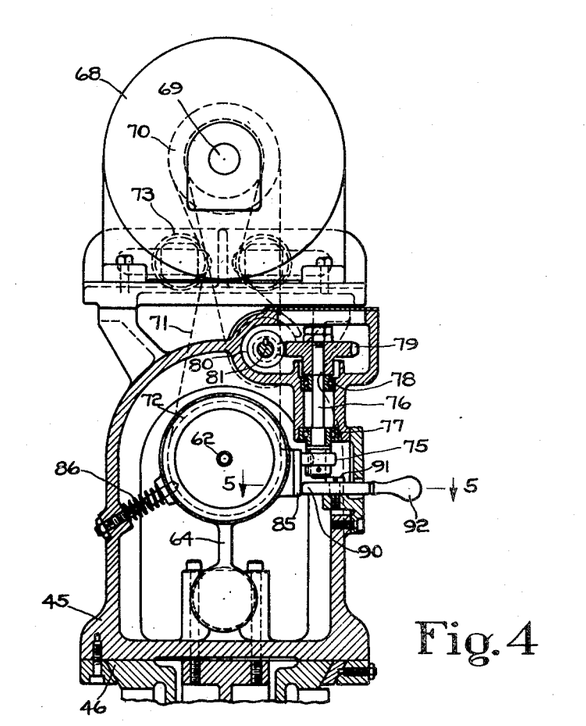
Fig. 4 is a vertical sectional view, on an enlarged scale, taken approximately on the line 4—4 of Fig. 2, showing the motor driven mechanism for rotating and for oscillating the grinding wheel.

In order to facilitate the grinding of cutting tools, it is desirable to transmit not only a rotary motion to the cutting tool but also an oscillating motion so that the tool may be ground without the necessity of moving the tool relative to the wheel face during the grinding operation. This is preferably accomplished by an oscillating mechanism comprising a cam 75 which is mounted on the lower end of a vertical shaft 76 (Fig. 4). The shaft 76 is supported in anti-friction bearings 77 and 78 supported in the wheel slide 45. A worm gear 79 is mounted on the upper end of the shaft 76 and meshes with a worm 80. The worm 80 is mounted on a horizontal shaft 81 (Figs. 2 and 4). A V-groove pulley 82 is mounted on the left hand end of the shaft 81 (Fig. 2) which is connected by a V-belt 83 with the motor pulley 70. The pivotally mounted frame 64 which supports the wheel spindle 62 is provided with a plate 85 (Fig. 4) which is normally maintained in engagement with the cam 75 by means of a compression spring 86 which is interposed between a portion of the wheel slide 45 and a stud projecting from the frame 64. It will be readily apparent from the foregoing disclosure that when the motor 68 is started, a rotary motion will be transmitted through the mechanism above described to rotate the cam 75 and thereby to transmit an oscillating motion to the frame 64, the wheel spindle 62, and the grinding wheel 47.

Figure 5:
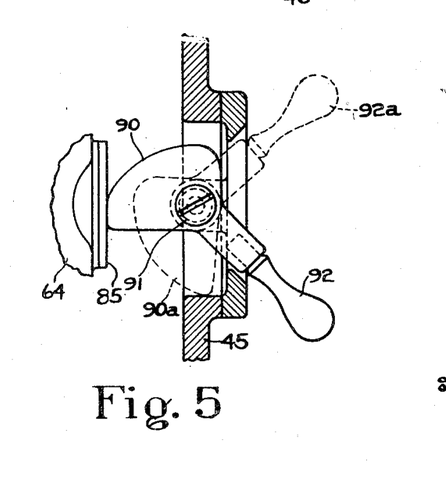
Fig. 5 is a fragmentary cross sectional view, on an enlarged scale, taken approximately on the line 5—5 of Fig. 4, showing the manually operated cam mechanism for starting and stopping the wheel spindle oscillation.

During a wheel truing operation and in setting up the machine, it is desirable to stop the oscillation of the grinding wheel. This may be accomplished by means of a cam 90 (Fig. 5) which is pivotally supported by a stud 91. The stud 91 is fixedly mounted relative to the wheel slide 45. A manually operable handle 92 is fixedly mounted relative to the cam 90. During the normal operation of the machine, the cam 90 and handle 92 are in dotted line positions 90a and 92a (Fig. 5). In this position of the parts the frame 64 is free to oscillate without interference of the cam 90. When it is desired to stop the oscillation of the frame 64 and the grinding wheel 47, the handle 92 is moved from position 92a in a clockwise direction into full line position 92 which serves to shift the cam 90 into the full line position (Fig. 5). During this movement the cam 90 engages the plate 85 on the frame 64 and swings the plate 85 on the frame 64 and swings the frame 64 in a counterclockwise direction (Fig. 4) against the compression of the spring 86 so that plate 85 is out of engagement with the cam 75 so as to prevent an oscillating movement of the frame 64 and the grinding wheel 47.

Figure 3:
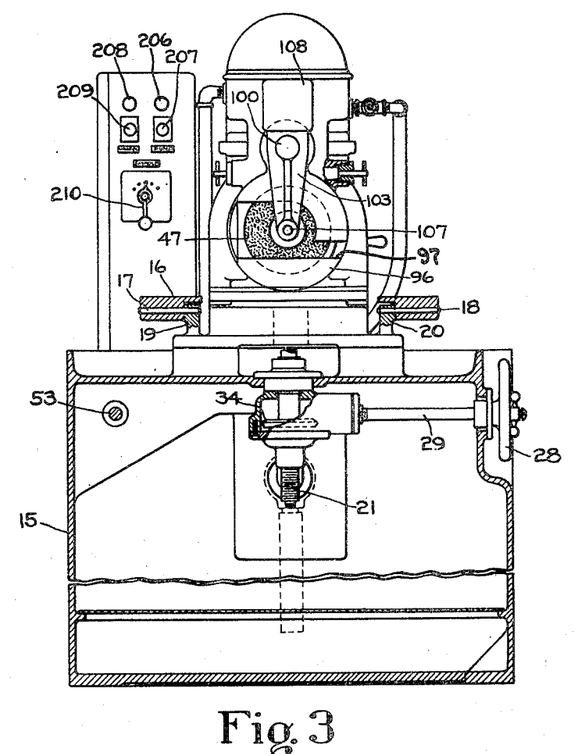
Fig. 3 is a vertical sectional view, on a reduced scale, taken approximately on the line 3—3 of Fig. 2, showing the adjusting mechanism for adjusting the tilt of the work table.

The grinding wheel 47 is surrounded by a cylindrically shaped wheel guard 95 (Fig. 17) which is fixedly mounted relative to the base 15. A guard cover 96 is rotatably supported by the wheel guard 95 and is provided with an opening to expose a predetermined portion of the operative face of the grinding wheel 47 as shown in Figs. 1 and 3. At the lower portion of the cover 96, a slot 97 extends across the remaining portion of the cover so that a chordal path across the face of the grinding wheel is exposed to facilitate grinding a master template as will be hereinafter described.

The driving motor 68 is preferably a reversible motor which is arranged to drive the grinding wheel 47 in either direction so that a grinding operation may be performed on either side of the wheel axis and the wheel driven in the desired direction. To facilitate grinding on the right hand portion of the grinding wheel 47 (Fig. 1), the guard cover 96 may be rotated 180° relative to the guard 95 (Fig. 17) so that the wide open portion of the cover plate 96 will expose the right hand portion of the operative face of the grinding wheel 47.

Figures 14, 15, 16, 17:
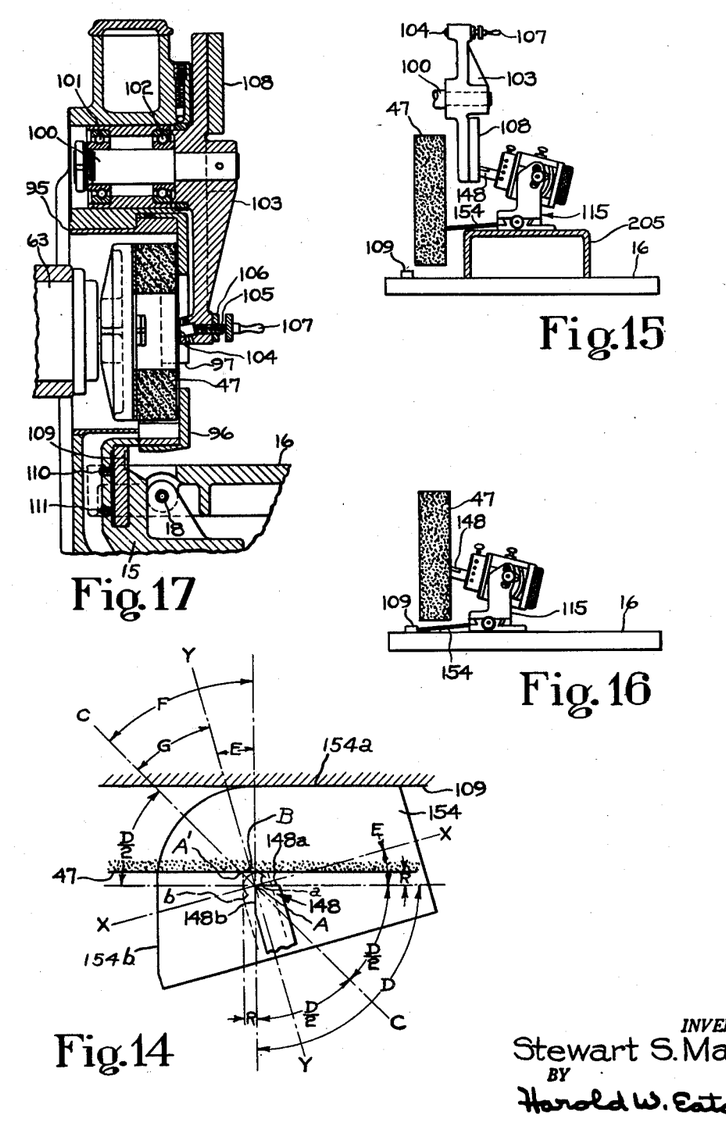
Fig. 14 is a diagrammatic view showing the manner of adjusting the master tool relative to the template to generating a radius on the template which is tangent to the two cutting faces of the tool.
Fig. 15 is a diagrammatic view showing the tool holder set upon the step block in position for grinding the template.
Fig. 16 is a similar diagrammatic view showing the tool holder in position on the table for grinding the tool after the template has been previously generated.
Fig. 17 is a fragmentary vertical sectional view, on an enlarged scale, through the grinding wheel, wheel guard and truing apparatus.

It is desirable to provide a grinding wheel truing apparatus which is arranged so that the operative face of the grinding wheel may be maintained in a predetermined location relative to other parts of the machine to be hereinafter described. As shown in Fig. 17, a rock shaft 100 is supported in anti-friction bearings 101 and 102. The right hand end of the rock shaft 100 supports a rock arm 103. The lower end of the rock arm 103 is provided with a diamond truing tool 104. The diamond truing tool 104 is supported in a cylindrical aperture formed in the lower end of the rock arm 103 and is clamped in adjusted position therein by means of a set screw. To facilitate adjusting the diamond truing tool to compensate for wear on the diamond truing tool, an adjusting screw 105 is provided by means of which the diamond may be adjusted toward or from the operative face of the grinding wheel 47. A lock nut 106 is provided to facilitate locking the screw 105 in adjusted position. A manually operable handle 107 is mounted on the end of the adjusting screw 105 to facilitate a manual swinging of the truing tool 104 across the operative face of the grinding wheel 47.

In order to facilitate accurate grinding of cutting tools to predetermined shapes, it is desirable to provide means whereby a template and the cutting tool may be precisely adjusted relative to the operative face of the grinding wheel 47. As illustrated in the drawings (Fig. 17) a calibrating block 108 having a plane operative face is provided. This calibrating block may be utilized in setting up a tool to be ground in the tool holder or may also be utilized in grinding a template from a master tool. The face of the calibrating block 108 when swung to a downward position (Fig. 15) is preferably located two inches forward of the operative face of the grinding wheel 47. A stop bar 109 (Fig. 17) is mounted in a groove formed in the base 15 and is held in fixed position relative thereto by means of a plurality of set screws 110 and 111. The face of the stop bar 109 is arranged two inches to the rear of the operative face of the grinding wheel 47. The operative face of the grinding wheel therefore in its normal position lies in a plane midway between the operative face of the calibrating block 108 and the face of the stop bar 109.

Figure 7:
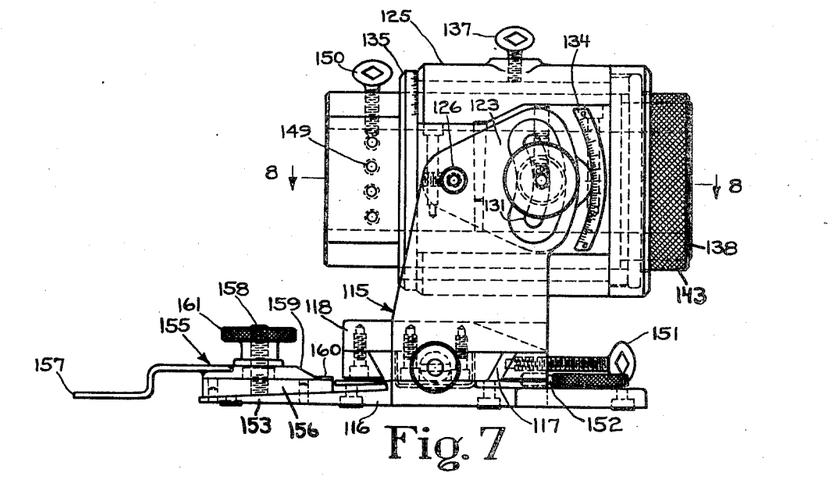
Fig. 7 is a side elevation, on an enlarged scale, of the tool holder showing the protractor in an operative position.
Figure 8:
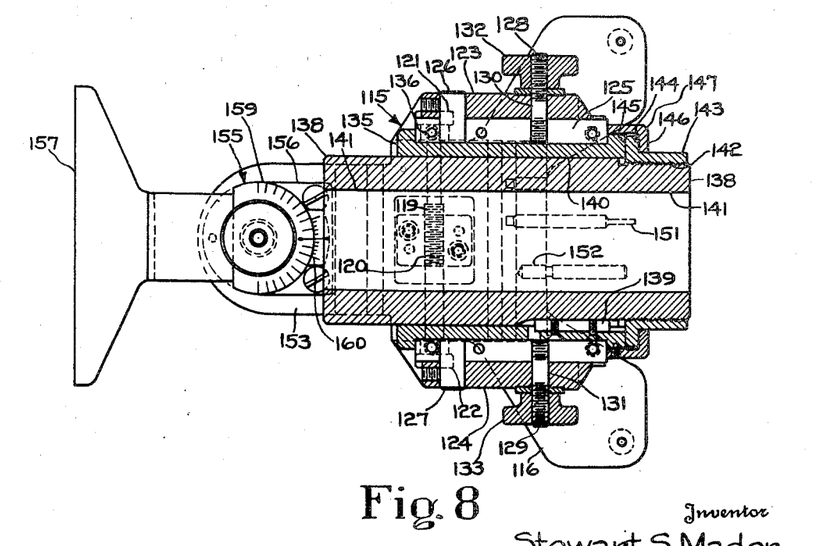
Fig. 8 is a horizontal sectional view taken approximately on the line 8—8 of Fig. 7, through the tool holder.
Figures 9, 12:
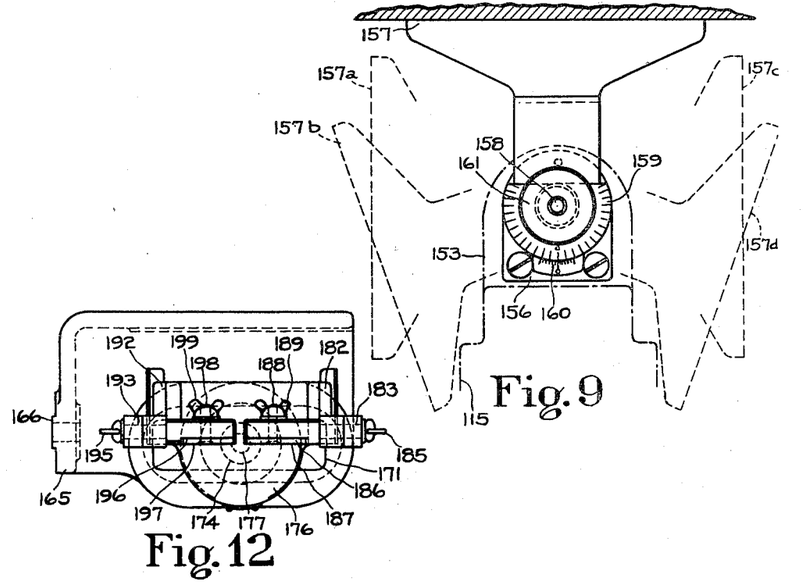
Fig. 9 is a fragmentary plan view showing the protractor head.
Fig. 12 is a plan view of the clearance gage setting mechanism.

To attain one of the objects of this invention an improved tool holder is provided such as for example that shown in my pending patent application, Serial No. 652,880 filed March 8, 1946 (U. S. Patent No. 2,475,796, dated July 12, 1949). The improved tool holder 115 as shown in Figs. 7, 8, 15 and 16 is provided with a base 116 which is formed as a plane surface so that it may be readily moved in any direction on the work table 16. The base 116 is provided with an upwardly extending dovetailed slideway 117 which mates with a correspondingly shape slideway formed on a transversely movable slide 118. A nut and screw adjusting mechanism is provided (Fig. 8) for precisely adjusting the position of the slide 118 relative to the base 116. As illustrated in the drawings, a rotatable screw 119 is supported by the slide 118 and meshes with a nut 120 carried by the base 116. A pair of knurled adjusting knobs 121 and 122 are mounted on opposite ends of the feed screw 119 (Fig. 8). The slide 118 is provided with two integral upwardly extending arms 123 and 124 which serve as a support for a frame 125. The frame 125 is provided with a pair of trunnion studs 126 and 127. A pair of clamping screws 128 and 129 pass through arcuate slots 130 and 131 formed in the upwardly extending arms 123 and 124 respectively and which screw thread into the frame 125. It will be readily apparent from the foregoing disclosure that the frame 125 may be pivotally adjusted relative to the upwardly extending arms 123 and 124 by loosening the knurled nuts 132 and 133 on the clamping screws 128 and 129, swinging the frame 125 to the desired angle after which the knurled nuts 132 and 133 may be again tightened to clamp the frame 125 in the desired adjusted position. As illustrated in Fig. 7, a calibrated scale 134 is mounted on the frame 125. An index point is provided on the arm 124 to facilitate readily adjusting the frame 125 to a predetermined angular position.

The frame 125 serves as a support for a rotatable sleeve 135 which is supported in a cylindrical bore 136 formed within the frame 125. A clamping screw 137 is provided on the frame 125 to facilitate clamping the sleeve 135 in the desired adjusted position.

A hollow tool supporting sleeve 138 is slidably keyed by means of a key 139 within a cylindrical bore formed within the sleeve 135. The sleeve 138 is provided with a square shaped tool supporting aperture 141. The sleeve 138 is provided with a threaded portion 142 which meshes with or engages with a threaded knurled collar 143. The collar 143 is provided with an integral flange 144 which serves as an end thrust member to allow rotation of the collar 142 but arranged to prevent endwise movement thereof. In order to hold the flange 144 against endwise movement, the flange 144 is located between a surface 145 formed on the end of the sleeve 135 and a flange 146 formed integral with a collar 147 which is screw threaded onto the sleeve 135. The surface 145 and the flange 146 serve to engage opposite faces of the flange 144 so as to prevent endwise movement thereof. It will be readily apparent from the foregoing disclosure that the knurled nut or collar 143 may be rotated to produce an axial feeding movement of the sleeve 138 so as to facilitate an adjustment of the sleeve 138 relative to the base 116 and the slide 118.

To facilitate clamping a cutting tool within the square shaped aperture 141 of the sleeve 138, a plurality of threaded holes 149 are provided in the sleeve 138 (Fig. 7). One or more clamping screws 150 may be placed in the desired threaded holes 149 so as to clamp a cutting tool 148 rigidly in position in the desired location within the square shaped aperture 141.

In order to facilitate locating the tool holder slide 118 relative to the tool holder base 116, a locating stud 152 is provided. The locating stud is arranged to be inserted in a hole half of which is formed in the underside of the slide 118 and the other half of which is formed in the tool holder base 116. A clamping screw 151 is provided (Figs. 7 and 8) to lock the tool holder slide 118 relative to the tool holder base 116.

The base of the tool holder 116 is formed with a forwardly extending portion 153 which serves as a support for a template 154 or a protractor head 155. The template 154 and the protractor head 155 are arranged to be interchangeably clamped to the tool holder when desired. The protractor head 155 may comprise a base portion 156 which is located in a predetermined relationship on the projection 153 by a plurality of dowel pins or studs (Fig. 7). The protractor head 155 is provided with an adjustably mounted straight edge 157 which is arranged to pivot about a stud 158. A graduated dial 159 which is fixedly mounted relative to the straight edge 157 serves to facilitate adjustment of the straight edge to the desired angular position. A vernier scale 160 is mounted on the base portion 156 of the protractor head 155 adjacent to the graduated dial 159 and serves to precisely locate the straight edge in the desired angular position. A knurled locking nut 161 is provided on the screw stud 158 to facilitate locking the protractor straight edge 157 in the desired angular position. The protractor head serves to facilitate grinding predetermined edge angles on a master tool and also to facilitate grinding corresponding angular faces on a master template as will be hereinafter described.

To facilitate setting up the tool holder 115 or grinding predetermined clearance angles on the face of a cutting tool, a clearance gage apparatus is provided comprising a bracket 165 which is adjustably mounted on a slideway 166 formed on the side face of the wheel guard 95. The bracket 165 is provided with an elongated slot 167. A threaded stud 168 passes through the elongated slot 167 (Fig. 11) and is screw threaded into the wheel guard 95. A knurled nut 169 is provided on the threaded stud 168 to facilitate clamping the bracket 165 in the desired position relative to the wheel guard 95. It will be readily apparent from the foregoing disclosure that the bracket 165 may be adjusted vertically to the desired height after which it may be clamped in adjusted position by means of the knurled nut 169.

Figure 10:
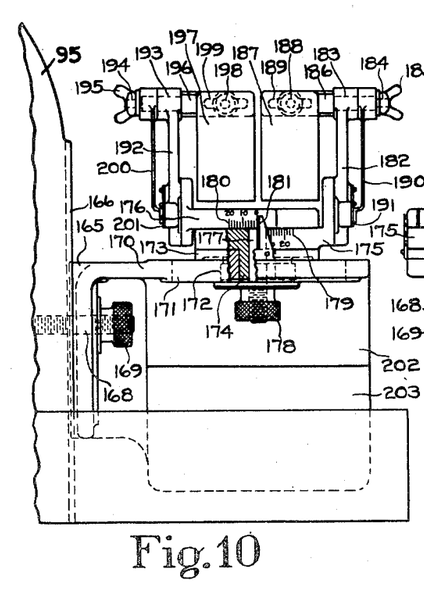
Fig. 10 is a fragmentary front elevation, on an enlarged scale, showing the clearance gage setting mechanism.
Figure 11:
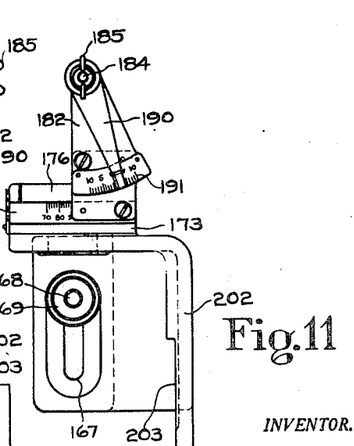
Fig. 11 is a right hand end elevation of the clearance edge setting mechanism as illustrated in Fig. 10.

The bracket 165 is provided with a horizontally extending portion 170 which is in turn provided with an elongated slot 171 (Figs. 10 and 11). The elongated slot 171 serves as a guide for a transversely adjustable slide 172. The slide 172 is provided with an integral flange portion 173 which slides on the upper surface of the horizontal projection 170. A sleeve 174 is rotatably supported within a central aperture formed in the slide 172. The sleeve 174 is provided with an integral flange 175. A rotatably mounted disc 176 is mounted above the integral flange 175 and is provided with an integral stud 177 which passes through a central aperture formed in the sleeve 174. The lower end of the stud 177 is threaded and is provided with a knurled clamping nut 178 (Fig. 10) by means of which the disc 176, the integral flange 175, and the slide 172 may be clamped in adjusted position relative to the horizontal arm 170. The integral flange 175 is provided with a scale 179 which is graduated in degrees. The disc 176 is similarly provided with a scale 180 which is also calibrated in degrees. An index or zero marker 181 is fixedly mounted on the flanged portion 173 of the slide 172 and serves to facilitate angular adjustment of the integral flange 175 and the disc 176.

The integral flange 175 is provided with a vertically extending arm 182 which serves as a support for a horizontally arranged stud 183 (Fig. 10). The stud 183 is provided with a threaded portion 184. A winged nut 185 is provided to facilitate clamping the stud 183 in adjusted position relative to the arm 182. The stud 183 is provided with a slabbed-off plane surface 186 which serves as a support for a plane surfaced gage vane 187. A screw 188 and a winged nut 189 serve to clamp the gage vane 187 on the stud 183. The stud 183 is provided with a fixedly mounted indicator arm 190 and the vertically extending arm 182 is provided with a graduated scale 191 to facilitate adjusting the gage vane to the desired angular position as will be hereinafter described.

The disc 176 is similarly provided with a vertically extending arm 192 which supports a horizontally arranged stud 193. The stud 193 is provided with a threaded portion 194 having a winged nut 195 by means of which the stud 193 may be clamped in adjusted position relative to the arm 192. The stud 193 is provided with a slabbed-off plane surface 196 which serves as a supporting surface for a plane surfaced gage vane 197. A screw 198 and a winged nut 199 serve to facilitate clamping the gage vane 197 to the stud 193. The stud 193 is provided with a fixedly mounted downwardly extending indicator arm 200. The vertically extending arm 192 is provided with a graduated scale 201 which is calibrated in degrees to facilitate adjusting the position of the gage vane 197 to the desired and predetermined angular position as will be hereinafter described.

The bracket 165 is provided with a vertically arranged portion 202 (Figs. 10 and 11) which is provided at its lower portion with a plane reference face 203 which serves to facilitate setting up the tool holder in a manner to be hereinafter described.

To facilitate a wet grinding operation, a motor driven pump (not shown) is provided for conveying coolant fluid to the grinding wheel 47 during the grinding operation. This pump driving motor is controlled by a push button start switch 206 and a push button stop switch 207 mounted on the front of a motor control panel (Fig. 1).

To control the driving motor 68, a push button start switch 208 and a push button stop switch 209 are mounted on the front of the control panel (Fig. 1) to facilitate starting and stopping the motor 68 as desired. The motor 68 is a reversible type motor which serves to permit rotation of the grinding wheel 47 in either direction as desired. The direction of rotation of the motor 68 is controlled by a reversing switch 210 (Fig. 1) which is also mounted on the front of the electric control panel.

A precision means including a hand wheel 28 and a screw 21 (Figs. 1, 3 and 13) is provided for adjusting the tilt of the table 16 so that it may be positioned horizontal or tilted relative thereto when desired. In grinding round nose and parting or cut-off tools where a predetermined front clearance angle and also side clearance angles are to be formed, the table 16 is precisely tilted to a predetermined angle for generating side clearance angles and the tool holder 115, frame 125 is tilted (but not rolled) to a predetermined angle so that the sum of the angle of the table 16 and the tilt of the tool holder frame 125 equals the front clearance angle to be ground on the tool. In the grinding of other tools, the table is set horizontal and the tool holder frame 125 is tilted and sleeve 135 rolled to predetermined angles to produce the predetermined clearance angles on the tools being ground.

*Operation*

The operation of the improved tool grinding machine will be readily apparent from the foregoing disclosure. Assuming that it is desired to grind a master tool in accordance with predetermined specifications, including edge angles and clearance angles. A master tool blank 148 is mounted in the tool holder 115, that is, it is inserted in the square-shaped aperture 141 in the sleeve 138 and is clamped in a predetermined position therein by means of clamping screws 150. The protractor head 155 is attached to the projection 153 of the tool holder 115 and the protractor blade 157 is adjusted to a predetermined angular position for grinding one of the edge angles on the master tool blank 148. The tool holder 115 is moved on the table 16 to position the protractor blade 157 in operative engagement with the stop bar 109. The table 16 is set horizontal and the tool holder set at zero degrees tilt and zero degrees roll so that right angle edge face will be ground on the end of the master tool blank 148. The master tool 148 may be fed toward the rotating and oscillating grinding wheel 47 by means of the knurled nut or collar 143 until an edge angle of the desired length is ground on the end face of the master tool blank 148.

The blade 157 of the protractor 155 is then angularly adjusted and set for grinding the second edge angle on the master tool blank 148. The tool holder 115 is moved on the table 16 to position the blade 157 in engagement with the stop bar 109. The master tool blank 148 is fed toward the rotating and oscillating grinding wheel 47 until a second edge angle of the desired length is ground on the master tool blank 148.

The protractor blade 157 then is set at zero degrees position. The clearance gauge bracket 165 is adjusted vertically to the proper position so that when the tool holder 115 is moved on the table 16 so that the protractor blade 157 is adjacent to the reference face 203, the clearance gauge vanes 187 and 197 will be positioned adjacent to the edge angle faces on the master tool blank 148. The clearance gauge vanes 187 and 197 are angularly adjusted and positioned for negative relief angles equal to the clearance or relief angles to be ground on the master tool 148. If negative clearance or relief angles are to be ground on the master tool 148, then the clearance gauge vanes 187 and 197 are adjusted to positive angles equal to the negative angles to be ground.

The edge angle dials or disks 175 and 176 are loosened by means of the knurled nut 178 so that the slide 172 may be adjusted laterally and so that the clearance gauge vanes 187 and 197 are free to swing about the axis of the stud 177. The tool holder 115 is moved on the table 16 to position the protractor blade 157 in engagement with the reference face 203. The master tool 148 is then fed toward the gauge vanes 187 and 197 by means of the knurled nut or collar 143. During the forward movement of the master tool 148, the frame 125 is tilted and the sleeve 135 rolled until the full areas of edge angle faces of the master tool 148 coincide with the plane faces of the clearance gauge vanes 187 and 197 respectively. The knurled nut 178 is then actuated to lock edge angle dials or disks 175 and 176 and the gauge vanes 187 and 197 in adjusted position.

The angular setting of the edge angle dials or disks 175 and 176, together with angle of tilt of frame 125 and roll of the sleeve 135 are then noted for future reference.

The clearance or relief angles on the master tool 148 are then ground. The protractor blade 157 is adjusted to an angular setting corresponding with the reading on the disk scale 179 (Fig. 10) after which the tool holder 115 is moved on the table 16 so that the protractor blade 157 engages the stop bar 109 while the clearance angle 148a is ground. The tilt of the tool holder frame 125 and the roll of the sleeve 135 remain fixed during this grinding operation. The protractor blade 157 is then adjusted to an angular setting corresponding with the reading on the disk scale 180, after which the clearance or relief angle 148b is ground. Having set the square ground master tool blank to negatively positioned gauge vanes 187 and 197 and then grinding these faces against a vertical plane faced wheel, the result is relief angles of a positive character are produced.

A master template is then produced while using the master tool as a template. The protractor head 155 is then removed from the tool holder 115 and a master template blank 154 mounted thereinstead. The tool holder slide 115 is locked in a center position by means of the locating pin or stud 152 and the clamping screw 151 (Figs. 7 and 8). The tool holder 115 is then positioned on a step block 205 (Fig. 15). The arm 103 is then swung 180° to position the calibrating or reference block 108 as shown in Fig. 15. The template 154 is then ground while moving and maintaining the master tool 148 in engagement with the reference block 108. Due to the fact that relief faces 148a and 148b on the master tool 148 intersect forming a sharp point or line and due to the fact that the face of the reference block 108 is spaced 2" in front of the operative face of the grinding wheel, a 2" radius will be generated on the template 154 which is tangent to the edge faces 154a and 154b.

The machine is now set up to generate a predetermined radius on the master tool 148. By manipulation of the hand wheel 52 and feed screw 49, the wheel slide 45 and the grinding wheel 47 are backed-off in a direction away from the operator and toward the stop bar 109 by an amount equal to the radius to be generated on the master tool 148. The tool holder 115 is then positioned on the table 16 with edge 154a of the template 154 in engagement with the stop bar 109 (Fig. 16), thus positioning the master tool 148 in the full line position (Fig. 14). By rotating the tool holder 115 in a clockwise direction, maintaining the template 154 in contact with the stop bar 109, the master tool 148 will pivot about point A and pass through an angle equal to the supplement of the included angle of the two cutting edges. In this case 90° although it can be any angle from 0° to any angle less than 180° within the limits of physical interferences of the tool holder 115 and the wheel guard 95 and the guard cover 96.

In order to grind a radius tangent to both the cutting edges 148a and 148b of the master tool 148, the tool must be positioned so as to have both cutting edges equally distant from the axis of rotation A as measured in directions normal to the edges 148a and 148b by the amount of the radius desired. The master tool 148 will then occupy the dotted line position (Fig. 14). Consequently the tool 148 must be adjusted along a line C—C until the point A lies at A1. As the tool 148 may be adjusted forward relative to the tool holder 115 along a line Y—Y to the amount AB and the tool holder slide 118 adjusted laterally relative to the tool holder base 116 by means of the adjusting screw 119 along a line X—X to the amount B—A1, these movements or adjustments will result in adjusting the tool 148 along the line C—C to the amount A—A1, this bringing the tool 148 into the required dotted line position (Fig. 14).

The practical way to accomplish these adjustments, and accurate within standard to plus .001", is as follows: With the tool holder 115 in position so that the edge 154a of the template 154, corresponding to the front cutting edge 148a of the master tool 148, is abutting the stop bar 109, advance the tool 148 in the tool holder 115 along line Y—Y until the front cutting edge 148a just contacts the operative face of the grinding wheel 47 in the wheel's adjusted position. Then rotate the tool holder 115 clockwise through an angle equal to the supplement of the included angle of the tool cutting edges 148a and 148b as determined by the template 154. It will be found that the side cutting edge 148b with the holder 115 rotated to the new position is still a distance from the face of the grinding wheel 47. By means of the screw 119, the tool holder slide 118 is moved laterally relative to the base 116 until the side cutting edge 148b of the master tool 148 moves part way to the wheel. This adjustment, being in the direction of line X—X and at an acute angle with the plane of the wheel face, will withdraw the front cutting edge 148a of the tool 148 away from the wheel. This retracting of the front cutting edge 148a from the wheel face 47 must be corrected by readjusting the tool forward in the tool holder 115 with the holder in the same position as when this adjustment was made previously. The forward adjustment of the tool 148 automatically advances the side cutting edge 148b in the direction necessary for it to contact the wheel face when the holder is in the rotated position. This explains why it is necessary to adjust the holder slide 118 laterally until side cutting edge 148b of the tool 148 is only part way to the wheel face in the initial lateral adjustment. By alternately making these adjustments, the tool 148 may be positioned in such a manner that both front and side cutting edges 148a and 148b will contact the wheel face when the corresponding edges 154a and 154b of the template 154 are abutting the stop bar 109.

With the above adjustments correctly made and with the rotary and oscillatory motion of the grinding wheel, it will be readily apparent that rotating the tool holder 115 on the table 16 from the position where the front cutting edge 148a is flush with the wheel face to the position where the side cutting edge is flush, that a radius equal to the adjustment of the wheel face from the normal position will be ground on the nose of the tool 148 tangent to both cutting edges 148a and 148b as represented in Fig. 14 by an arc a—b.

For extreme accuracy these adjustments may be made with a dial indicator held in a fixed position relative to the tool holder base 116. In order to make adjustments by dial readings, it is necessary to know the exact value in linear measurement of the adjustments. These values can be readily computed in the following manner. To position the tool 148 for grinding the radius as indicated in Fig. 14 by dotted lines, it is necessary to adjust the tool along the path A—A. As there are only two ways to adjust the tool and these ways take the directions along lines X—X and Y—Y, it is necessary to compute the value of the distances B—A and AB respectively.

As shown in Fig. 14 angles are noted as follows:

D = included edge angle
E = front edge angle
$$G = 90° - \left(\frac{D}{2} + E\right)$$

$$F = G + E$$

Then the length of adjustment along Y—Y is equal to $$AB = AA' \times \cos G$$

$$AA' = \frac{R}{\cos F}$$

Therefore $$AB = \frac{R}{\cos F} \times \cos G$$

And the length of adjustment along XX is equal to $$BA' = AA' \times \sin G \text{ or } BA' = \frac{R}{\cos F} \times \sin G$$

Using the completed master tool 148 as a template, the template 154 should then be reground in the usual manner. The grinding wheel 47 is reset to its former position with its operative face midway between the plane of the calibrating block 108 and the stop bar 109. The tool holder 115 is set on the step block 205 (Fig. 15) and the tool holder slide 118 adjusted laterally to a center position with the locating stud 152 in position. Then while maintaining the master tool 148 in engagement with the calibrating block 108, the tool holder 115 is swung to generate a corresponding radius on the template 154 and to regrind the edges thereof. The reground template 154 is now ready to be used to regrind cutting tools or to grind new master tools from a blank.

The angle of tilt of the tool holder frame 125 and the degrees of roll of the sleeve 135 are noted so that the tool holder 115 may be readily set up for regrinding tools in accordance with a given template. For regrinding tools to correspond with a master shape, it is merely necessary to apply the proper template to the tool holder 115, then to set the angle of tilt and degrees of roll so that the tool may be reground having predetermined edge angles and clearance angles.

It will be readily apparent from the foregoing disclosure that a master tool and template may be readily generated from predetermined specifications. Templates may be readily produced from master tools, and new tools ground and worn tools reground accurately with predetermined edge angles and clearance angles.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a tool grinding machine having a rotatable grinding wheel, a transversely movable slide therefor, a work table adjacent thereto, a pivotally mounted frame on said slide to support said wheel, means including a cam to oscillate said frame, driving means including an electric motor simultaneously to rotate said grinding wheel and to rotate said cam to oscillate said frame, a stop bar parallel to and spaced to the rear from the grinding wheel face, a tool holder adapted to slide on said table, a hollow tool supporting sleeve rotatably mounted on said holder, means adjustably to tilt said sleeve in a vertical plane to position a tool to be ground for grinding a predetermined clearance on the end face of said tool, means precisely to rotate said sleeve about its axis to position the tool for grinding a predetermined side clearance on the tool, and a master template on said holder which is arranged to engage the stop bar to facilitate grinding a predetermined shape on the tool being ground, said rotating and oscillating grinding wheel serving to impart the desired grinding action on the tool being ground while the tool holder is moved with the template in engagement with the stop bar.

2. In a tool grinding machine having a base, a rotatable grinding wheel having a plane operative face, a transversely movable slide on said base, a pivotally mounted frame on said slide to support said wheel, means including a cam to oscillate said frame, means including an electric motor to rotate said grinding wheel and to rotate said cam so as to oscillate said frame and grinding wheel, a feeding mechanism to feed said slide transversely, a table on said base adjacent to said wheel face, a pivotally mounted arm, a calibrating block on said arm having a plane face spaced in front of the wheel face, said arm serving to move the calibrating block to and from an operative position, a step block on said table, a tool holder on said step block having a hollow sleeve to support a master tool in operative engagement with said calibrating block, means adjustably to tilt said sleeve in a vertical plane, means adjustably to rotate said sleeve about its axis to precisely position said master tool for a template grinding operation, and a template on said holder which is ground to a predetermined shape by the rotating oscillating grinding wheel while the tool holder is moved on the step block with the master tool in engagement with the calibrating block.

3. In a tool grinding machine having a base, a rotatable grinding wheel having a plane operative face, a table on said base adjacent to said wheel face, a transversely movable slide for said wheel, a feeding mechanism to feed said slide toward and from the table, a stop bar on said base which is arranged parallel with the grinding wheel face, a tool holder slidably mounted on the table, a hollow sleeve on said tool holder to support a master tool to be ground, means to tilt and roll said sleeve so as to position a tool being ground for grinding predetermined clearance angles thereon, and a protractor head having an adjustable blade on said tool holder to facilitate grinding predetermined edge angles on a master tool with the tool holder moved on the table to position the protractor blade in engagement with the stop bar.

4. In a tool grinding machine having a base, a transversely movable slide thereon, a pivotally mounted frame on said slide, a rotatable grinding wheel on said frame having a plane operative face, said frame being arranged to swing in a direction normal to the wheel axis, means including a cam to oscillate said frame, yieldable means to maintain said frame in operative engagement with said cam, a motor on said slide, driving connections between said motor and the grinding wheel to rotate said wheel, independent driving connections between said motor and said cam to oscillate said frame and grinding wheel, a nut and screw feed mechanism for adjusting said slide transversely relative to said base, a work table adjacent to said grinding wheel, a stop bar parallel to and spaced to the rear from the grinding wheel face, a tool holder adapted to slide on said table, said tool holder serving precisely to position a tool to be ground, and a template on said holder which is arranged to engage the stop bar to facilitate grinding a predetermined shape on the tool being ground, said rotating and oscillating grinding wheel serving to impart the desired grinding action on the tool being ground while the tool holder is moved with the template in engagement with the stop bar.

STEWART S. MADER.

REFERENCES CITED

The following references are of record in the file of this patent:

UNITED STATES PATENTS

| Number | Name | Date |
|---|---|---|
| 565,644 | Taylor | Aug. 11, 1896 |
| 1,072,629 | Lumsden | Sept. 9, 1913 |
| 1,431,024 | Munthe | Oct. 3, 1922 |
| 1,621,553 | Miller | Mar. 22, 1927 |
| 1,811,254 | Bayley | June 23, 1931 |
| 2,381,034 | Bura | Aug. 7, 1945 |
| 2,426,478 | Whipple | Aug. 26, 1947 |
| 2,475,796 | Mader | June 12, 1949 |

FOREIGN PATENTS

| Number | Country | Date |
|---|---|---|
| 782,883 | France | Mar. 25, 1935 |